(12) United States Patent
Andreopoulos et al.

(10) Patent No.: US 11,514,298 B2
(45) Date of Patent: Nov. 29, 2022

(54) HIGH-FRAME-RATE REAL-TIME MULTISCALE SPATIOTEMPORAL DISPARITY ON DISTRIBUTED LOW-POWER EVENT-BASED NEUROMORPHIC HARDWARE

(71) Applicant: INTERNATIONAL BUSINESS MACHINES CORPORATION, Armonk, NY (US)

(72) Inventors: Alexander Andreopoulos, San Jose, CA (US); Hirak Jyoti Kashyap, San Jose, CA (US); Myron D. Flickner, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1065 days.

(21) Appl. No.: 16/176,744

(22) Filed: Oct. 31, 2018

(65) Prior Publication Data
US 2022/0164970 A1    May 26, 2022

(51) Int. Cl.
*G06N 3/04* (2006.01)
*G06N 3/063* (2006.01)

(52) U.S. Cl.
CPC ............. *G06N 3/049* (2013.01); *G06N 3/063* (2013.01)

(58) Field of Classification Search
CPC ......... G06N 3/049; G06N 3/063; G06V 10/82
See application file for complete search history.

(56) References Cited

U.S. PATENT DOCUMENTS

| | | | |
|---|---|---|---|
| 8,694,449 B2 | 4/2014 | Weng et al. | |
| 9,014,216 B2* | 4/2015 | Lazar | H03M 1/125 370/521 |
| 9,171,249 B2* | 10/2015 | Lazar | G06N 3/08 |
| 9,713,982 B2 | 7/2017 | Bulbas et al. | |
| 9,939,253 B2* | 4/2018 | Richert | G06T 7/593 |
| 10,057,593 B2* | 8/2018 | Richert | G06T 7/579 |
| 2010/0312730 A1* | 12/2010 | Weng | G06N 3/02 706/15 |

(Continued)

OTHER PUBLICATIONS

Andreopoulos et al., "A Low Power, High Throughput, Fully Event-Based Stereo System", Proceedings of the IEEE Conference on Computer Vision and Pattern Recognition (CVPR), Jun. 2018 (Year: 2018).*

(Continued)

*Primary Examiner* — Aaron W Carter
(74) *Attorney, Agent, or Firm* — Erik A. Huestis; Stephen J. Kenny; Foley Hoag, LLP (57) ABSTRACT

High-framerate real-time spatiotemporal disparity mechanisms on neuromorphic hardware are provided. In various embodiments, a first and second spiking input sensor each output a time series of spikes corresponding to a plurality of frames. A neurosynaptic network is configured to receive the time series of spikes corresponding to the plurality of frames; accumulate the time series of spikes in a ring buffer, thereby creating a plurality of temporal scales; for each corresponding pair of frames from the first and second spiking input sensors, determining a mapping of pixels in one of the pair of frames to pixels in the other of the pair of frames based on similarity; based on the pixel mapping, determining a disparity map.

20 Claims, 10 Drawing Sheets

(56) References Cited

U.S. PATENT DOCUMENTS

| | | | |
|---|---|---|---|
| 2014/0267606 A1* | 9/2014 | Lazar | H04N 19/88 |
| | | | 348/43 |
| 2015/0269480 A1* | 9/2015 | Levi | G06N 3/08 |
| | | | 706/25 |
| 2016/0086052 A1 | 3/2016 | Piekniewski | |
| 2018/0174026 A1* | 6/2018 | Davies | G06N 3/063 |
| 2018/0174033 A1* | 6/2018 | Davies | G06N 3/08 |
| 2018/0181861 A1* | 6/2018 | Sumbul | G06N 3/063 |
| 2020/0014904 A1* | 1/2020 | Wetzstein | H04N 13/178 |
| 2020/0097801 A1* | 3/2020 | Andreopoulos | G06N 3/063 |
| 2020/0134843 A1* | 4/2020 | Andreopoulos | G06K 9/6292 |
| 2021/0012909 A1* | 1/2021 | Koh | G16H 40/63 |
| 2021/0031367 A1* | 2/2021 | Mirzaei | B25J 9/1666 |
| 2021/0326694 A1* | 10/2021 | Wang | G06N 3/04 |
| 2021/0374552 A1* | 12/2021 | Mallya | G06T 11/60 |
| 2022/0164970 A1* | 5/2022 | Andreopoulos | G06N 3/049 |

OTHER PUBLICATIONS

Anonymous, "Predicted Performance Disparity Between a Copy Services Source and Target," (2013).

Diehl et al., "Fast-classifying, high-accuracy spiking deep networks through weight and threshold balancing," International Joint Conference on Neural Networks (IJCNN) (2015).

Firouzi et al., "Asynchronous Event-based Cooperative Stereo Matching Using Neuromorphic Silicon Retinas," Neural Process Lett, 43(2):311-326 (2015).

Lagorce et al., "Spatiotemporal features for asynchronous event-based data," Front Neurosci, 9(46):1-13 (2015).

Semwal et al., "Real-time Spatio-Temporal Analysis and Prediction of Traffic using Social Media," (2015).

* cited by examiner

HIGH-FRAME-RATE REAL-TIME MULTISCALE SPATIOTEMPORAL DISPARITY ON DISTRIBUTED LOW-POWER EVENT-BASED NEUROMORPHIC HARDWARE

This invention was made with Government support under FA8750-17-C-0097 awarded by USAF, AFMC Air Force Research Laboratory. The Government has certain rights in this invention.

BACKGROUND

Embodiments of the present disclosure relate to neuromorphic hardware, and more specifically, to high-framerate real-time spatiotemporal disparity mechanisms.

BRIEF SUMMARY

According to embodiments of the present disclosure, systems for stereo disparity determination on neuromorphic hardware are provided. A first and second spiking input sensor each output a time series of spikes corresponding to a plurality of frames. A neurosynaptic network is configured to receive the time series of spikes corresponding to the plurality of frames; accumulate the time series of spikes in a ring buffer, thereby creating a plurality of temporal scales; for each corresponding pair of frames from the first and second spiking input sensors, determining a mapping of pixels in one of the pair of frames to pixels in the other of the pair of frames based on similarity; based on the pixel mapping, determining a disparity map.

According to embodiments of the present disclosure, methods of and computer program products for stereo disparity determination on neurosynaptic hardware are provided. A time series of spikes corresponding to a plurality of frames from a first and second spiking input sensor is received at a neurosynaptic network. The time series of spikes is accumulated in a ring buffer of the neurosynaptic network, thereby creating a plurality of temporal scales. For each corresponding pair of frames from the first and second spiking input sensors, the neurosynaptic network determines a mapping of pixels in one of the pair of frames to pixels in the other of the pair of frames based on similarity. Based on the pixel mapping, the neurosynaptic network determines a disparity map.

DETAILED DESCRIPTION

Stereo vision is what enables humans to perceive depth, and is important in fields such as robotics, where it is used to extract information about the relative position of 3D objects in the vicinity of autonomous systems. Other applications include object recognition where depth information is used as a segmentation cue that enables the system to separate occluding image components, such as one chair in front of another, which may otherwise not be distinguishable as separate objects by other criteria.

Digital stereo vision is also useful for, e.g., the extraction of information from aerial surveys, calculation of contour maps, geometry extraction for 3D building mapping, calculation of 3D heliographical information, augmented and virtual reality, robotic manufacturing such as fully automated assembly line manufacturing and inspection, multi-camera phones for fast focus adjustment and bokeh effects, and high frame-rate movie cameras for fast automatic focus adjustment.

Arrays of extremely low power neurosynaptic processing units, called neurosynaptic cores, provide an architecture to solve exascale big data problems. These cores use spikes to encode information. In a network of neurosynaptic cores, neurons on each core can connect to any axon of any other neurosynaptic core (including itself). When a neuron spikes, it sends a spike packet that gets delivered to a target axon on a destination core.

In digital spiking neuromorphic systems, information is represented and delivered by spikes, where each spike is a digital packet of information, carrying one or more bits. For example, the IBM TrueNorth chip is a digital spiking neuromorphic system where each spike carries a single bit of information (a binary spike). Spiking neural networks such as TrueNorth are based on delivering packets of information over switched communication wires, thereby significantly reducing the required wiring. The presence of a spike is treated as receiving a 1, its absence represents a 0. More values can be coded into binary spikes using several different spike coding schemas.

A spike communication from a source neuron on a source core, to a target axon on a destination core, would effectively need to traverse certain number of hops via routers in a 2D grid in either the horizontal or vertical or a combination of both to be delivered to the target axon on a destination core. Each hop a spike packet traverses, consumes power and energy.

Within an exemplary neuromorphic system such as TrueNorth, a fixed amount of time is allowed for a spike to travel from its source neuron to its destination axon. This fixed window is referred to as a tick. The time a spike requires for its journey varies based on the distance the spike must travel and the number of 2-D mesh routing, chip and board interfaces that the spike travels across.

On each tick, the neurons in a core are processed sequentially, starting with the first neuron and continuing through the last neuron. Accordingly, in addition to the transmission delays discussed above, each spike is also delayed by some additional fixed amount based on which neuron on a core generated it. For example, in an exemplary neuromorphic system such as TrueNorth having 256 neurons per core, the 256th neuron is not processed until the preceding 255 neurons are processed.

According to various embodiments of the present disclosure, a neurosynaptic program represents a neurosynaptic network. A neurosynaptic program includes information relating to the neurosynaptic network. In some embodiments, the information includes neuronal properties and dynamics that determine an electronic neuron's response to input spikes. For example, neuronal properties and dynamics can include a threshold parameter, a leak parameter, a delay parameter, or a reset parameter. In some embodiments, the neurosynaptic program information includes synaptic connections of the neuron (e.g., synaptic connections made via a synaptic crossbar). In some embodiments, the neurosynaptic program information includes axon properties (e.g., axon types). In some embodiments, the neurosynaptic program information includes one or more destinations (e.g., target axons) that the neuron's output spike should be delivered to.

According to various embodiments, a neurosynaptic network represents an instantiation of a neurosynaptic program. A neurosynaptic network may be instantiated in hardware, in simulation or in both. For example, a neurosynaptic program may give rise to one or more instances of a neurosynaptic network, wherein the instances may reside on a single core, multiple cores, or multiple chips.

According to various embodiments, a neuromorphic core circuit represents an example neurosynaptic network described by a neurosynaptic program.

According to various embodiments, a corelet or a Corelet Programming Language represent software that provide abstraction of neurosynaptic programs. A composition of neurosynaptic programs may be created by composing corelets.

A TrueNorth program is a complete specification of a network of neurosynaptic cores, along with its external inputs and outputs. In various embodiments, a divide-and-conquer approach is adopted whereby a large network of neurosynaptic cores is constructed by interconnecting a set of smaller networks of neuro synaptic cores, where each of the smaller networks, in turn, could be constructed by interconnecting a set of even smaller networks, and so on, down to a network consisting of a single neuro synaptic core, which is the fundamental non-divisible building block. This programming paradigm is referred to as Corelet Programming.

Figure 1:
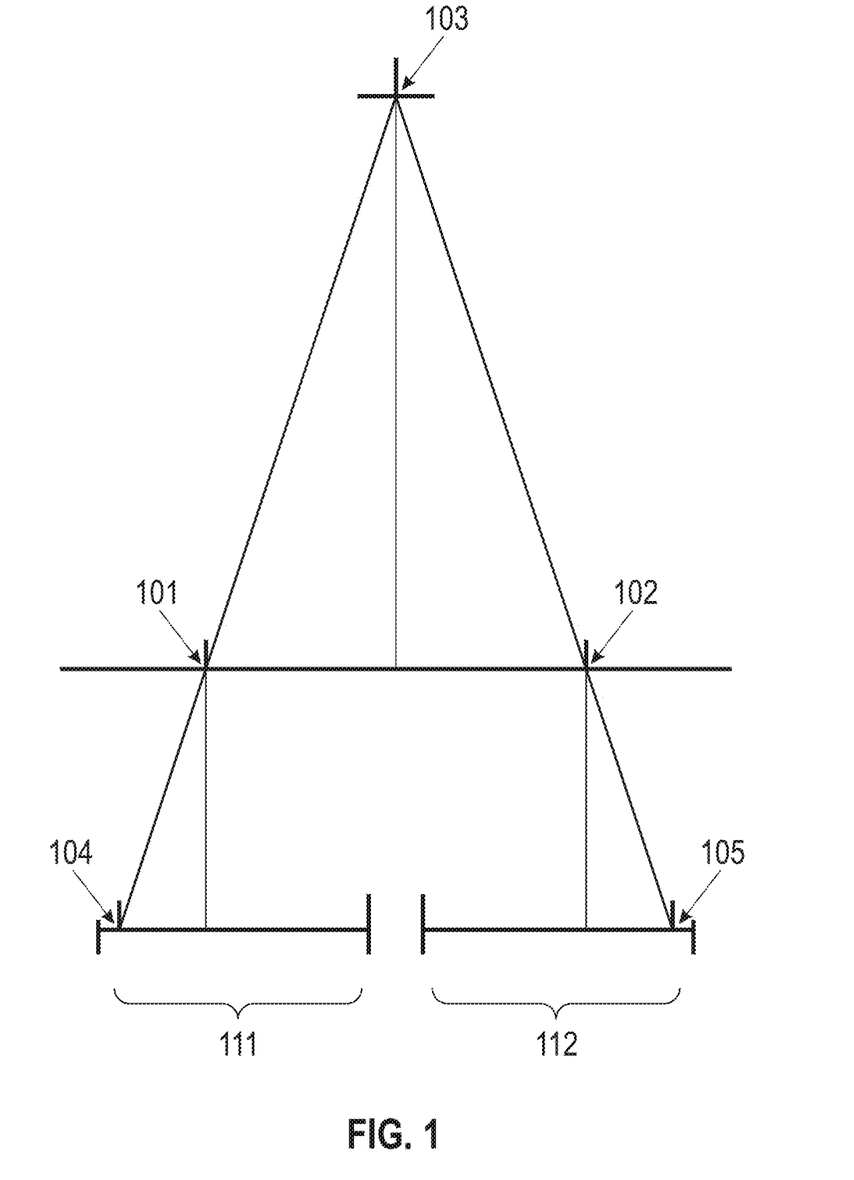
FIG. 1 illustrates the mechanics of stereo vision.

Referring to FIG. 1, the mechanics of stereo vision are illustrated. In particular, the relationship of image displacement to depth is shown with stereoscopic images assuming flat co-planar images. In this figure, a pinhole camera model is assumed, where points 101, 102 denote the pinhole location and 103 is the 3D point in space being imaged. Point 103 gets projected to points 104, 105 in the two camera planes, 111, 112, respectively. Given a point 104, in the left camera 111, and given an algorithm to determine point 105 in right camera 112, imaging the same point in 3D space, it is possible to reconstruct the point 103 in space with respect to a given coordinate frame.

This displacement between corresponding pixels in the two cameras is referred to as the disparity. Thus, the stereo problem is reduced to the problem of determining correspondences between two or more cameras. If the cameras are not co-planar, a rectification step is needed to simulate coplanarity. For the projected point 104 on the left camera plane 111 and the corresponding projected point 105 on the right camera plane 112, the same source point 103 in 3D space may be found by solving the correspondence problem, which can then be used to construct the 3D coordinates of point 103 with respect to the camera reference frame.

Figure 2:
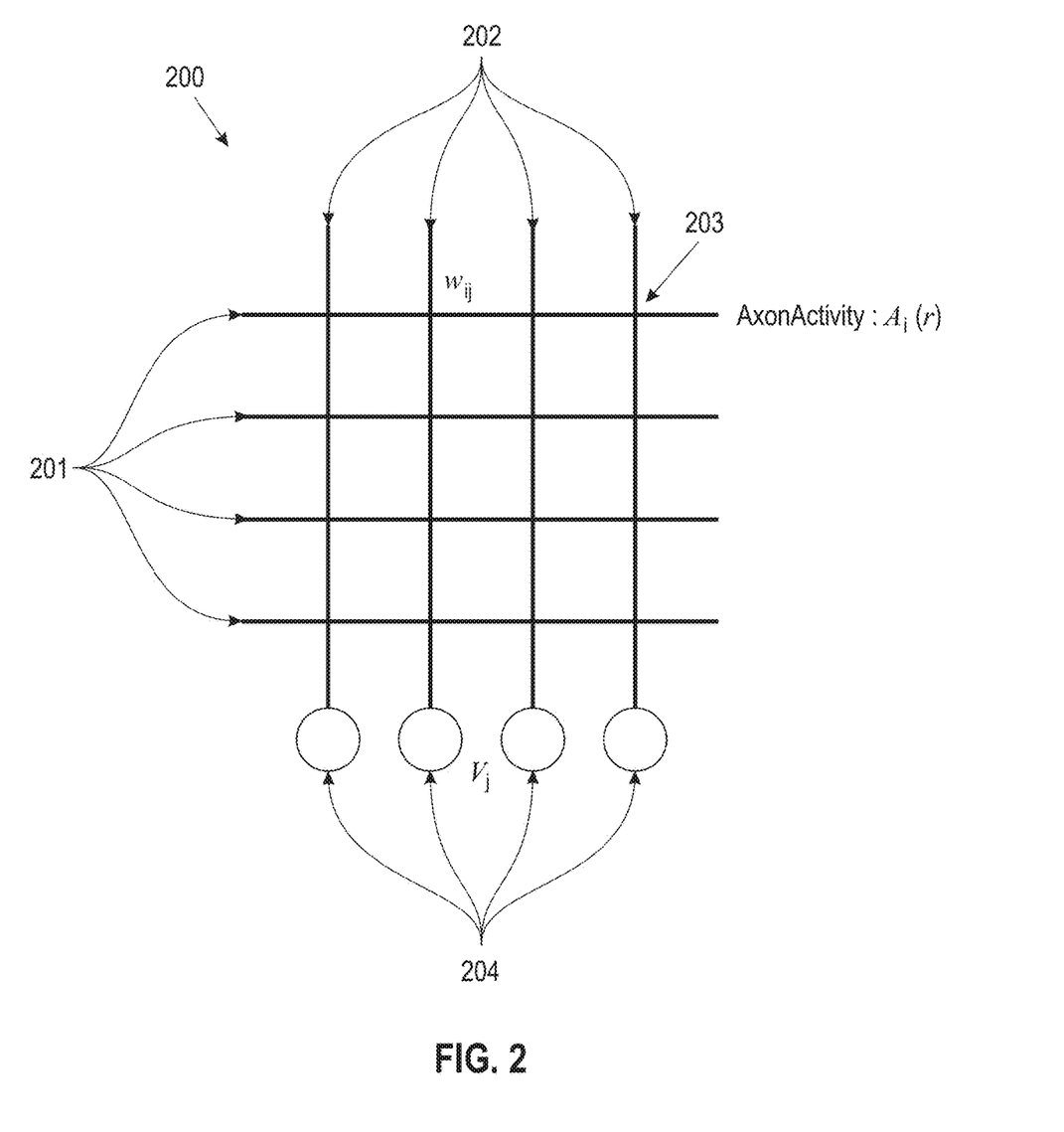
FIG. 2 depicts a neurosynaptic core according to embodiments of the present disclosure.

With reference now to FIG. 2, a neurosynaptic core according to embodiments of the present disclosure is depicted. In some embodiments, neurosynaptic core 200 includes axons 101, represented as rows, dendrites 202, represented as columns, synapses 203, represented as row-column junctions, and neurons 204 that receive inputs from dendrites. In some embodiments, there are 256 axons, and 256 neurons. In such embodiments, there are 256×256=65,536 synapses. Information flows from axons 201 to the neurons 204, modulated by the synapses 203. In various embodiments, the synapses may be binary, and may be associated with synaptic weights.

Figure 3:
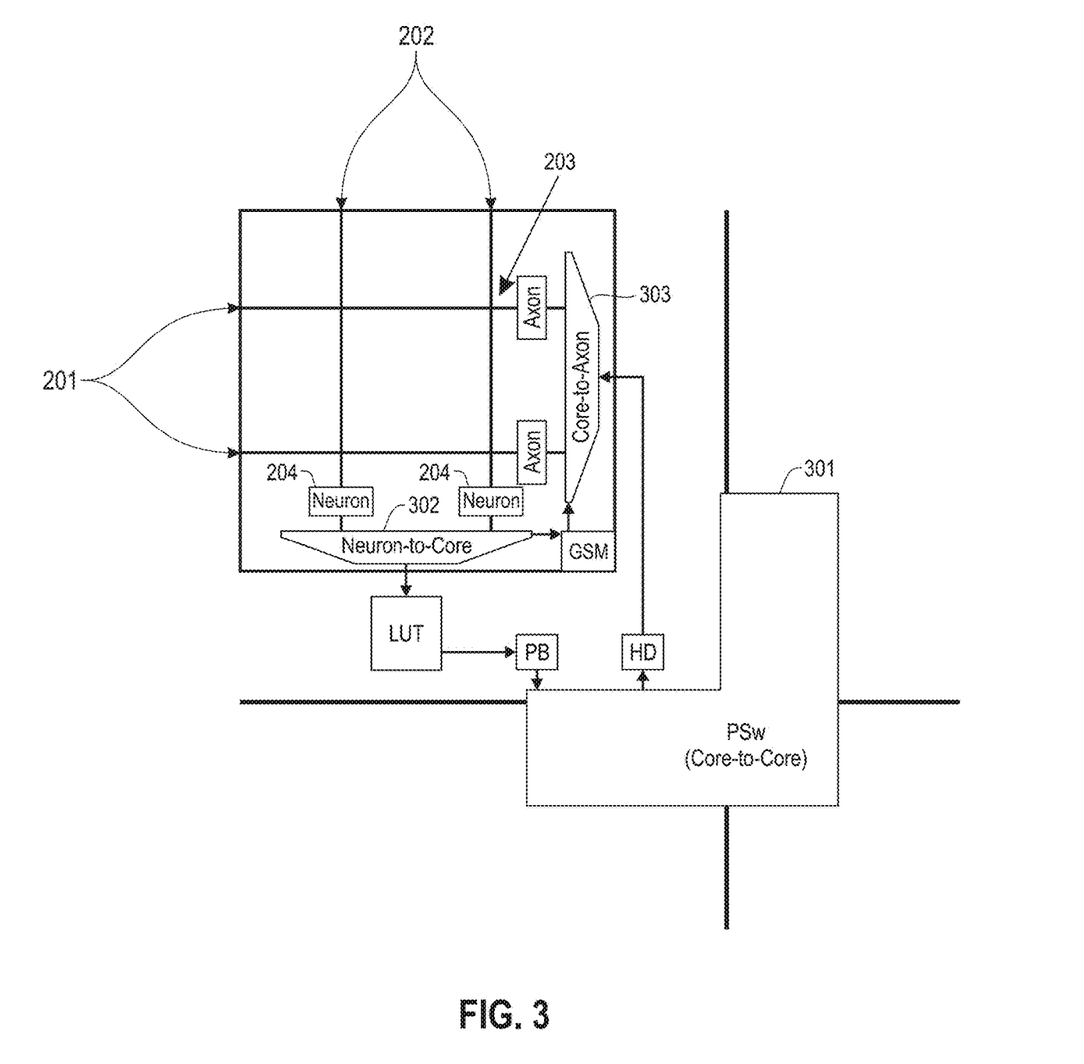
FIG. 3 depicts a neurosynaptic core and mesh router according to embodiments of the present disclosure.

In some embodiments a plurality of neurosynaptic cores are tiled on a chip. In an exemplary embodiment, a 64 by 64 grid of cores is tiled, yielding 4,096 cores, for a total of 1,048,576 neurons and 268,435,456 synapses. In such embodiments, neurons, synapses, and short-distance connectivity are implemented by the core circuit. Long-distance connectivity is logical. An exemplary embodiment is depicted in FIG. 3. Mesh router 301 provides communication between cores. Also on a given core, neuron to core 302 and core to axon 303 communication links are provided.

In various embodiments of the present disclosure, an algorithm is provided for calculating disparities on neuromorphic hardware by distributing the computation across multiple neuromorphic boards (a scale out approach).

An exemplary embodiment on the TrueNorth architecture demonstrates that the algorithm can calculate disparities at 2000 frames per second (with 1 tick per 0.5 ms), making the algorithm ideal for use with high speed cameras such as Dynamic Vision Sensors or high frame rate RGB cameras whose image is transduced to a spike-based representation.

Stereo algorithms are computationally expensive, making real-time performance (e.g., 30 fps video) an expensive proposition. Low-power neuromorphic architectures for solving the problem of dense disparity calculation are therefore highly desirable for hard-real-time applications such as autonomous driving and robotics. Commercial LiDAR sensors which are often used by autonomous vehicles operate at 15 fps-60 fps, well below the performance described herein, making them inferior to the present approach when a vehicle is moving at high velocities, e.g., on a freeway.

The approaches described herein are highly scalable to larger input image sizes with a linear increase in neuromorphic processor requirements. Sparse computation, finding correspondences only for pixels with spike events, lead to further energy efficiency. It will be appreciated that while various examples provided herein are given in terms of TrueNorth, the present disclosure is applicable to any spiking neuromorphic architecture.

Figure 4:
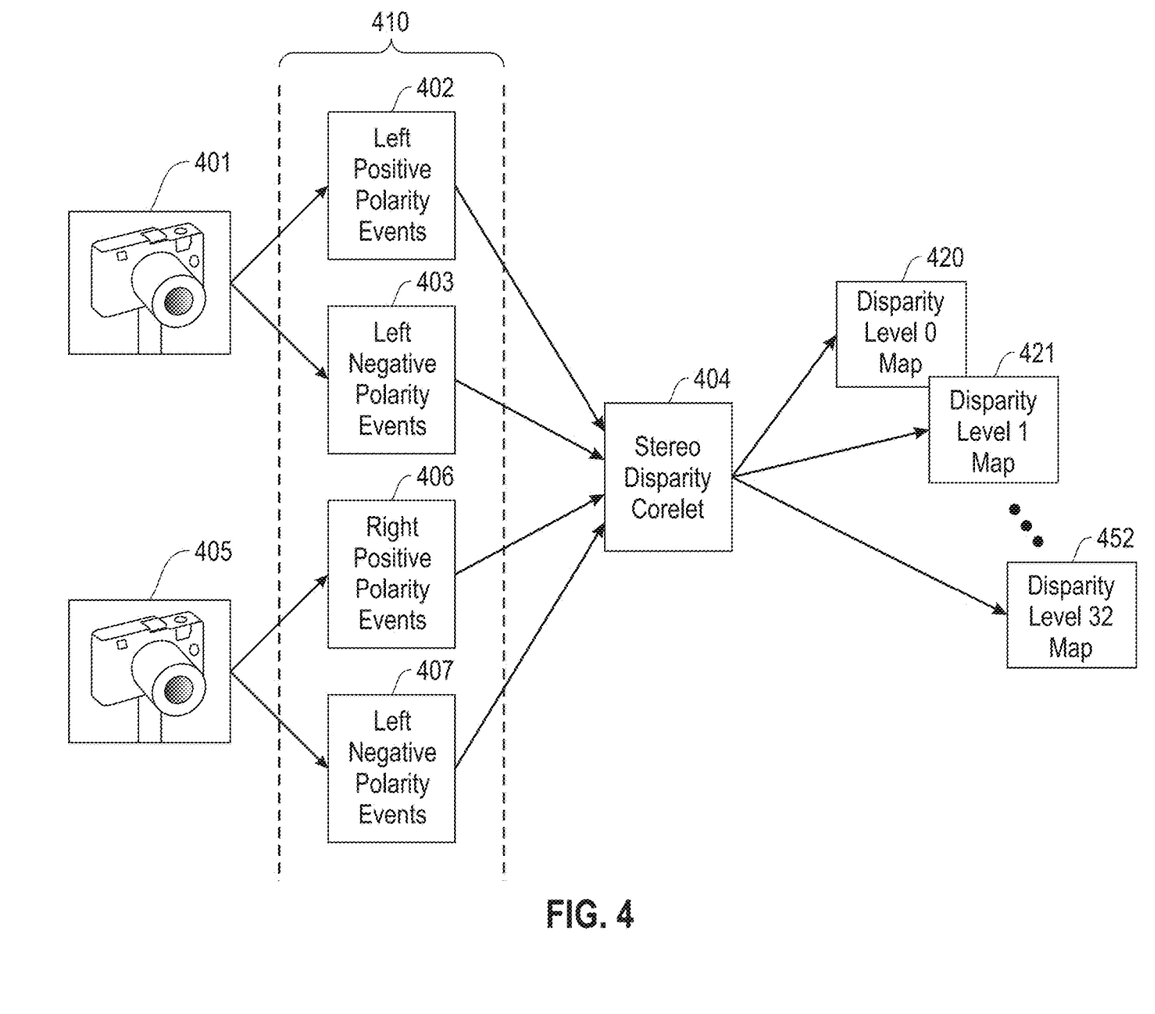
FIG. 4 is a schematic view of a stereo disparity corelet according to embodiments of the present disclosure.

Referring to FIG. 4, a schematic view is provided of a stereo disparity corelet according to embodiments of the present disclosure. A left camera 401 provides positive polarity events 402 and negative polarity events 403 via input connectors 410 to stereo disparity corelet 404. Right camera 405 likewise provides negative and positive polarity events 406, 407.

Corelet 404 outputs a plurality of disparity maps 420 . . . 452 corresponding to levels 0 . . . 32. A spike at a pixel in a given disparity map x denotes that the disparity value is x at that pixel. A pixel with no spike in any of the disparity maps denotes that no disparity is found, which may be due to occlusion.

Figure 5:
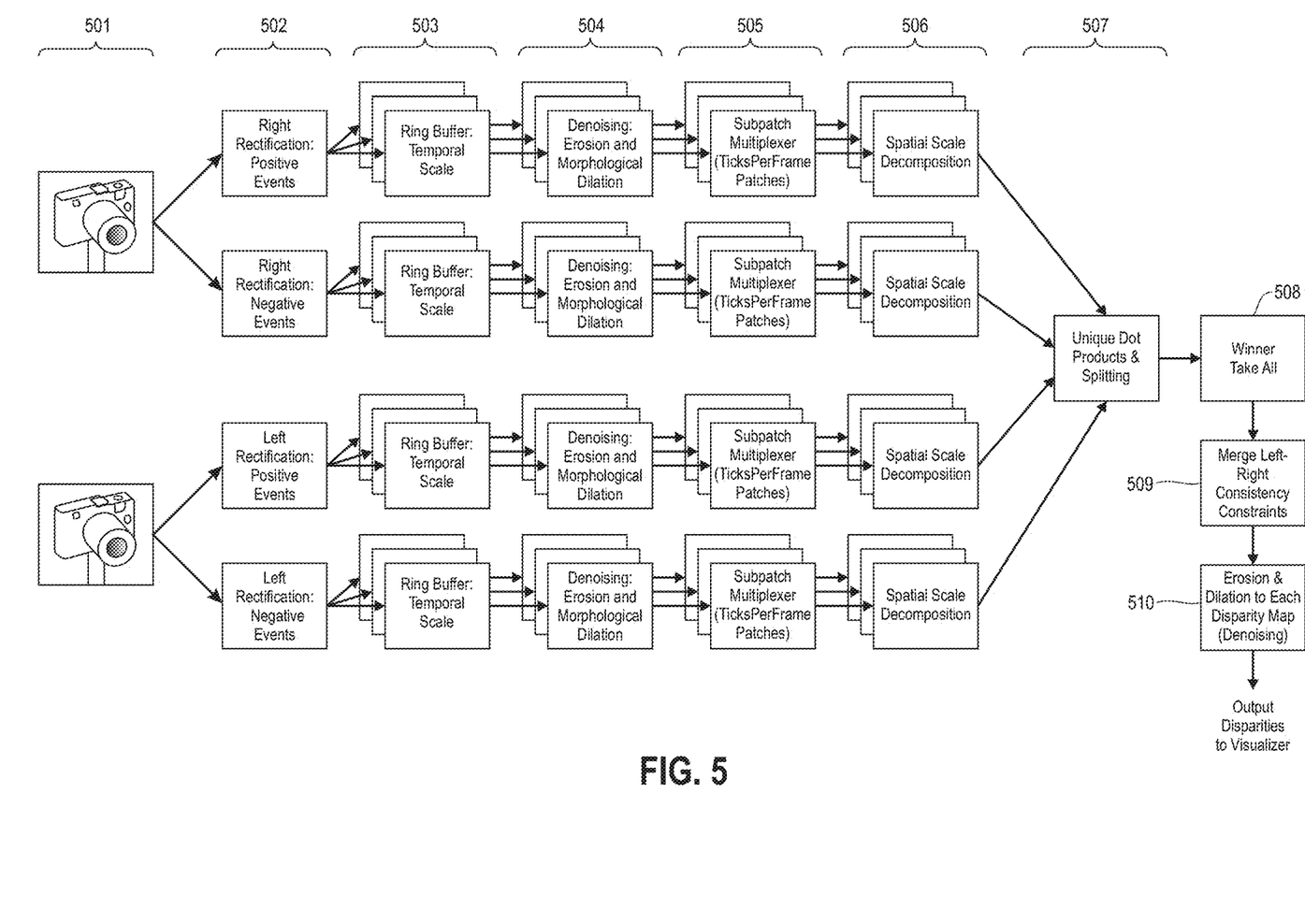
FIG. 5 is a schematic view of an event-based system architecture according to embodiments of the present disclosure.

Referring to FIG. 5, a schematic view is provided of an event-based system architecture according to embodiments of the present disclosure. Cameras 501 provide left and right positive and negative events 502. Accordingly, four channels are provided at this stage. The events are provided to ring buffers 503. Each ring buffer per channel corresponds to a temporal scale. Accordingly, one or more temporal scale is provided per channel. An exemplary embodiment of a ring buffer is described in commonly invented and assigned application Ser. No. 16/140,269, filed Sep. 24, 2018, which is hereby incorporated by reference in its entirety.

At 504, denoising is applied, which in some embodiments includes erosion and morphological dilation. At 505, a subpatch multiplexor is applied. At 506, spatial scale decomposition is applied, which in some embodiments comprises multiscale pyramid creation. The unique dot products are computed across all channels at 507. A winner take all block is applied at 508. A left-right consistency check is performed at 509. In some embodiments, erosion and dilation is applied to each disparity map at 510 before outputting the disparities for visualization.

In an exemplary embodiment, a pair of synchronized DAVIS240C cameras are connected via Ethernet to a cluster of TrueNorth NS1e boards. The use of DAVIS sensors improve speed, power, dynamic range, and computational requirements. Fast moving objects are more challenging for frame-based cameras. The IBM TrueNorth chip consumes 70 mW when operating at a 1 ms computation tick and normal workloads. Depending on event dynamics and network architecture, faster tick period is possible. In exemplary embodiments described herein, a 0.5 ms per tick is used, thus doubling the maximum throughput achievable.

Each neuron can generate an output event deterministically, if the membrane potential V(t) exceeds a threshold; or stochastically, with a probability that is a function of the difference between the membrane potential and its threshold. The membrane potential is updated at each tick t to $$V(t) = V(t-1) + \frac{\partial V(t)}{\partial t},$$

followed by the application of an activation function $a_n(V(t))$ where $$a_n(V(t)) = \begin{cases} 1, & \text{if } V(t) \geq n \\ 0, & \text{otherwise} \end{cases} \qquad \text{Equation 1}$$

Each neuron is assigned an initial membrane potential V(0). Furthermore, upon producing an event, a neuron is reset to a user-specified value. Unless specified otherwise, initial membrane potentials and reset values of zero are assumed.

Local event-based stereo correspondence algorithms according to the present disclosure are implemented end-to-end as a neuromorphic event-based algorithm. This consists of systems of equations defining the behavior of neurons (e.g., on TrueNorth). In TrueNorth based embodiments, system configuration may be encased in corelets.

The stereo rectification is defined by a pair of functions $\mathcal{L}, \mathcal{R}$, which map each pixel in the left and right sensor's rectified space to a pixel in the left and right sensor's native resolution respectively. This is implemented in various embodiments using |H|·|W| splitter neurons per sensor and polarity channel, arranged in an |H|×|W| retinotopic map. The events at each rectified pixel $p \in H \times W \times \{\mathcal{L}, \mathcal{R}\} \times \{+, -, \{+, -\}\}$ are generated through splitter neurons which replicate corresponding sensor pixels.

Their membrane potential $V_p^{spl}(t)$ is defined by $$\frac{\partial V_p^{spl}(t)}{\partial t} = I(t-1; p')$$

where $I(t; p') \to \{0,1\}$ denotes whether a sensor event is produced at time t and the sensor pixel p' corresponding to the rectified pixel p. $a_1(V_p^{spl}(t))$ defines the activation of the corresponding neuron. Potentials are initialized to zero and set to also reset to zero upon spiking.

The event rate of an event-based sensor depends on factors, such as scene contrast, sensor bias parameters, and object velocity. To add invariance across event rates, spikes are accumulated over various temporal scales through the use of temporally overlapping sliding windows. These temporal scales are implemented through the use of splitter neurons that cause each event to appear at its corresponding pixel multiple times, depending on the desired temporal scale, or through the use of temporal ring buffer mechanisms, which lead to lower event rates.

In various embodiments, a ring buffer is implemented by storing events in membrane potentials of memory cell neurons in a circular buffer, and through the use of control neurons that spike periodically to polarize appropriate memory cell neurons. Buffers can encode the input at various temporal scales. For example at a scale T=5 the buffer denotes if an event occurred at the corresponding pixel during the last 5 ticks (logical disjunction).

A control neuron that produces events with period T and phase $\phi$ is defined by a neuron $a_T (V_\phi^{ctrl})$ that satisfies $$\frac{\partial V_\phi^{ctrl}(t)}{\partial t} = 1, \; V_\phi^{ctrl}(0) = \phi$$

and resets to zero upon producing an event ($a_T(V(t))$ is an activation function equal to 1 if the membrane potential at time t−V(t)—is at least equal to T and is equal to 0 otherwise). Through populations of such neurons one can also define $a_T (V_{[\phi,\theta]}^{ctrl})$ corresponding to phase intervals [$\phi$, $\theta$] (where $\theta-\phi+1 \leq T$), defining periodic intervals of events. Such control neurons are used to probe (prb) or reset (rst) neuron membrane potentials. A memory cell neuron is a recurrent neuron which accepts as input either its own output (so that it does not lose its stored value whenever the neuron is queried for its stored value), input axons to set the neuron value and control axons for resetting and querying the memory cell. In more detail the output at index $r \in \{0, \ldots, T+1\}$ of a T+2 size memory cell ring-buffer at a given pixel p, is multiplexed via two copies ($m \in \{0,1\}$) and is defined as $a_2 (V_{p,m,r}^{mem})$ where:

$$\frac{\partial V_{p,m,r}^{mem}(t+1)}{\partial t} = \bigl[-a_{T+2}\bigl(V_{s+1}^{rst}((t))\bigr) + \qquad \text{Equation 2}$$
$$\bigl([a_1(V_p^{spl}(t))]_r^r \vee [a_2(V_{p,m,r}^{mem}(t-1))]_r^m\bigr) +$$
$$[a_{T+2}(V_{[3-r,T+2-r]}^{prb}(t))]_r^m -$$
$$[a_{T+2}(V_{[2-r,T+1-r]}^{rst}(t))]_r^{1-m}\bigr]_+$$

In Equation 2, probe/reset (prb/rst) control neurons are used, $\hat{r}=t \bmod(T+2)$, $\hat{s}=T+2-r \bmod(T+2)$, $\hat{t}=t \bmod(2)$, $\vee$ is logical disjunction, $a_1(V_p^{spl})$ denotes a splitter neuron at pixel p (providing a copy of the data/spikes at pixel p before entering the ring buffer), and:

$$[x]_{\hat{r}}^r = \begin{cases} \max\{0, x\}, & \text{if } r = \hat{r} \\ 0, & \text{otherwise} \end{cases} \quad \text{Equation 3}$$

In Equation 3, $[x]_+ \overset{\text{def}}{=} [x]_1^1$ defines a ReLU function.

In various embodiments, disjunction is implemented by sending input events to the same neuron input axon, effectively merging any input events to a single input event.

Equation 3 defines a ring-buffer with T+2 memory cells, where probe pulses periodically and uniformly query T of the T+2 cells for the stored memory contents at each tick, where m=0 neurons are probed at odd ticks and m=1 neurons are probed at even ticks. Reset pulses control when to reset one of the T+2 memory cells to zero in preparation of a new input.

New inputs $(a_1(V_p^{spl}(\bullet)))$ are always routed to the cell r that was reset in the previous tick. The probe pulses result in the creation of an output event if during the last T ticks $a_1(V_p^{spl}(\cdot))$ produced an event. After a probe event, a reset event decrements the previous +1 membrane potential increase, followed by the restoring of the memory event output during the last probe $(a_2(V_{p,m,r}^{mem}(t-1)))$.

In various embodiments, binary morphological erosion and dilation is optionally applied on the previous module's outputs to denoise the image. Given a 2-D neighborhood N(p) centered around each pixel p, the erosion neuron's membrane potential $V_p^e$ is guided by the system of equations $$\frac{\partial V_p^e(t)}{\partial t} = \left[1 - |N(p)| + \Sigma_{q \in N(p)} \Sigma_m \vee_r a_2(V_{q,m,r}^{mem}(t-1))\right]_+$$

and uses an $a_1$ activation function. Similarly, dilation neurons $V_p^d$ with receptive fields N(p) evolve according to $$\frac{\partial V_p^d(t)}{\partial t} = \Sigma_{q \in N(p)} a_1(V_q^e(t-1))$$

where $a_1$ is also used as the dilation neurons' activation function. The neuron potentials are initialized to zero and set to also reset to zero upon producing a spike. In various embodiments, 3×3 pixel neighborhoods are used. At each tick, erosion and dilation neurons output the minimum and maximum value respectively, of their receptive fields. Cascades of erosion and dilation neurons, are used to denoise retinotopic binary inputs.

Each feature extracted around a rectified pixel p is a concatenation of event patches, extracted from one or more spatiotemporal scales. Spatial scaling consists of spatially sub-sampling each output map of the temporal scale phase, to apply the window matching on the sub-sampled data. This results in spatiotemporal coordinate tensors $\chi_{L,p}, \chi_{R,p}$ defining the coordinates where events form feature vectors. The ith of these coordinates is represented by neuron activations $a_1(V_{x_{L,p}^{(i)}}^{L\{+,-\}}(t))$ and $a_1(V_{x_{R,p}^{(i)}}^{R\{+,-\}}(t))$ in the left and right sensor's positive (+) or negative (−) polarity channel. For notational simplicity, the +, − superscripts may be omitted. The left and right sensors could produce distinct event streams based on event polarity, or could merge events in a single polarity-agnostic stream.

Given a pair of spatiotemporal coordinate tensors $\chi_{L,p}, \chi_{R,q}$ centered at coordinates p, q in the left and right rectified image respectively and representing K coordinates each, the binary Hadamard product $f_L(p, t)^\circ f_R(q, t)$ associated with the corresponding patches at time t, where $f_L(p,t) = \pi_i\{a_1(V_{x_{L,p}^{(i)}}^L(t))\} \in \{0,1\}^K$ and $f_R(q,t) = \pi_i\{a_1(V_{x_{R,p}^{(i)}}^R(t))\} \in \{0,1\}^K$. The product is calculated in parallel across multiple neurons, as K pairwise logical AND operations of corresponding feature vector entries, resulting in $(a_1(V_{p,q,1}^{dot}), \ldots, a_1(V_{p,q,K}^{dot}))$ where $$\frac{\partial V_{p,q,t}^{dat}(t)}{\partial t} = \left[a_1\left(V_{x_{L,p}^{(i)}}^L(t-1)\right) + a_1\left(V_{x_{B,q}^{(i)}}^R(t-1)\right) - 1\right]_+.$$

The population code representation of the Hadamard product output is converted to a thermometer code, which is passed to the winner-take-all circuit described below. For example, given a population code (1, 1, 0, 1, 0) for value 3, its thermometer code is the right-aligned juxtaposition of all events: (0, 0, 1, 1, 1).

The winner-take-all (WTA) system is a feed-forward neural network that takes as input D thermometer code representations of the Hadamard products for D distinct candidate disparity levels, and finds the disparity with the largest value, at every tick. For designing a scalable and compact WTA system on a neuromorphic hardware, the following encoding techniques are used for inputs in various embodiments. In a binary event-based system, numbers can be efficiently coded using base-4 representation where each digit is encoded using a 3-bits thermometer code. This is denoted as Quaternary Thermometer Code (QTC). A thermometer code of length $2^n$ bits can be represented by a QTC of length $3*\lceil n/2 \rceil$ bits. For example, values between 0-255 are represented by a QTC of 12 bits. While it takes a few more bits than an 8 bits binary code, it allows designing a feed-forward WTA network comprising only four cascaded subnetworks, compared to eight for a binary representation, requiring fewer hardware resources as well as half the latency. Latency is further improved with larger bases, but the growth in thermometer code length for each digit results in consuming more hardware resources. Table 1 shows binary, base-4 and QTC representation of example decimal numbers.

TABLE 1

| Decimal | Binary | Base-4 | QTC |
|---|---|---|---|
| 126 | 01-11-11-10 | 1-3-3-2 | 001-111-111-011 |
| 174 | 10-10-11-10 | 2-2-3-2 | 011-011-111-011 |
| 33 | 00-10-00-01 | 0-2-0-1 | 000-011-000-001 |
| 167 | 10-10-01-11 | 2-2-1-3 | 011-011-001-111 |
| 26 | 00-01-10-10 | 0-1-2-2 | 000-001-011-011 |

A maximum thermometer code length of $4^{B+1} \geq K$ is assumed for some $B \in \mathbb{N}$. Then for any $\alpha \in \{0,1,2\}, \beta \in \{0, 1, \ldots, B\}$, we define the conversion of candidate disparity level $d \in \{0, \ldots, D-1\}$ to a QT-coded membrane potential $V_{\alpha,\beta,d}^{CNV}(t)$ as $$\frac{\partial V_{\alpha,\beta,d}^{CNV}(t)}{\partial t} = \left[\sum_{i \in U(\beta)} v_d^i(t-1) - \sum_{i \in U(\beta+1)} 4v_d^i(t-1) - \alpha\right]_+ \quad \text{Equation 4}$$

where $v_d^i(t)$ is the ith element of the input thermometer code for dth disparity level at time t and $U(\beta)=\{n\in \mathbb{N} : n\equiv 0 \pmod{4^\beta}, 1\leq n<4^{B+1}\}$. The i variable indexing $(v_d^i)$ starts from the right of the thermometer code $v_d$ for $(a_1(V_{p,q,1}^{dot}), \ldots, a_1(V_{p,q,K}^{dot}))\in \{0,1\}^K$. All the conversion neurons use an $a_1$ activation function and reset to 0 membrane potential upon spiking. $a_1(V_{2,\beta,d}^{CNV}(t))$, $a_1(V_{1,\beta,d}^{CNV}(t))$, $a_1(V_{0,\beta,d}^{CNV}(t))$ is a length-3 thermometer code representation of a value in $\{0,1,2,3\}$, representing the $\beta$th digit in the base-4 representation of $v_d(t-1)$.

For a set of QT-coded inputs, the WTA system is realized by a cascade of (B+1) feed-forward pruning networks where each of the pruning networks process only 3-bits of the QT codes and prune the inputs not equal to the bitwise maximum of corresponding 3-bits thermometer codes from all inputs. Now starting from the most significant bits, all the inputs smaller than the maximum will be pruned at different stages and only the winner(s) will survive at the output of the last cascade network. The membrane potential $V_{\beta,d}^{WTA}$ of stage $\beta$ and disparity index d is given by $$\frac{\partial V_{\beta,d}^{WTA}(t)}{\partial t} = \qquad \text{Equation 5}$$

$$4 \cdot W_{\beta,d}(t-1) + \sum_{\alpha=0}^{2}\left[a_1\left(V_{\alpha,B-\beta,d}^{CNV}(t-\beta)\right) - \max_{\vec{d}\in\{d'|W_{\beta,d'}(t-1)>0\}}\left\{a_1\left(V_{\alpha,B-\beta,\vec{d}}^{CNV}(t-\beta)\right)\right\}\right] - 3\right]_+$$

where $$W_{\beta,d}(t) = \begin{cases} a_1(V_{\beta-1,d}^{WTA}(t)), & \forall \beta > 0, \\ 1, & \text{if } \beta = 0 \end{cases} \qquad \text{Equation 6}$$

The function $W_{\beta,d}(t)$ represents the candidate status of the dth input at the end of $\beta$th stage. Initially all the inputs are winning candidates ($W_{0,d}(t)=1$) and the status changes after the input is pruned at any stage indicating it is out of the competition and the selection process continues with remaining candidates. As an illustration, the winner from the values of Table 1 is computed and the winner selection process is shown in Table 2.

TABLE 2

| Value | $W_0$ | Stage-0 | $W_1$ | Stage-1 | $W_2$ | Stage-2 | $W_3$ | Stage-3 |
|---|---|---|---|---|---|---|---|---|
| 126 | 1 | 001 | 0 | | 0 | | 0 | |
| 174 | 1 | 011 | 1 | 011 | 1 | 111 | 1 | 011✓ |
| 33 | 1 | 000 | 0 | | 0 | | 0 | |
| 167 | 1 | 011 | 1 | 011 | 1 | 001 | 0 | |
| 26 | 1 | 000 | 0 | | 0 | | 0 | |
| stage max | | 011 | | 011 | | 111 | | 011 |

A left-right consistency check is then performed to verify that for each left-rectified pixel p matched to right-rectified pixel q, it is also the case that right-rectified pixel q gets matched to left-rectified pixel p. This is achieved using two parallel WTA streams. Stream 1 calculates the winner disparities for left-to-right matching, and stream 2 calculates the winner disparities of right-to-left matching. The outputs of each stream are represented by D retinotopic maps expressed in a fixed resolution ($D_{i,j,d}^v(t)$, $d\in \{0, \ldots, D-1\}$, $v\in\{L, R\}$), where events represent the retinotopic winner disparities for that stream. The streams are then merged to produce the disparity map $D_{i,j,d}^{L,R}(t)=a_1(V_{i,j,d}^{L,R}(t))$ where $$\frac{\partial V_{i,j,d}^{L,R}(t)}{\partial t} = \qquad \text{Equation 7}$$

$$\left[D_{i,j,d}^L(t-1) + D_{i,j-d,d}^R(t-1) + a_1\left(V_{(i,j,\mathcal{L},\cdot)}^{spl}\right)(t-\hat{t})) - 2\right]_+$$

where $\hat{t}$ is the propagation delay of the first layer splitter output events until the left-right consistency constraint merging takes place. This enforces that an output disparity is produced at time-stamp t and pixel (i,j) only for left-rectified pixel (i,j), where an event was produced at $t-\hat{t}$.

Figure 6:
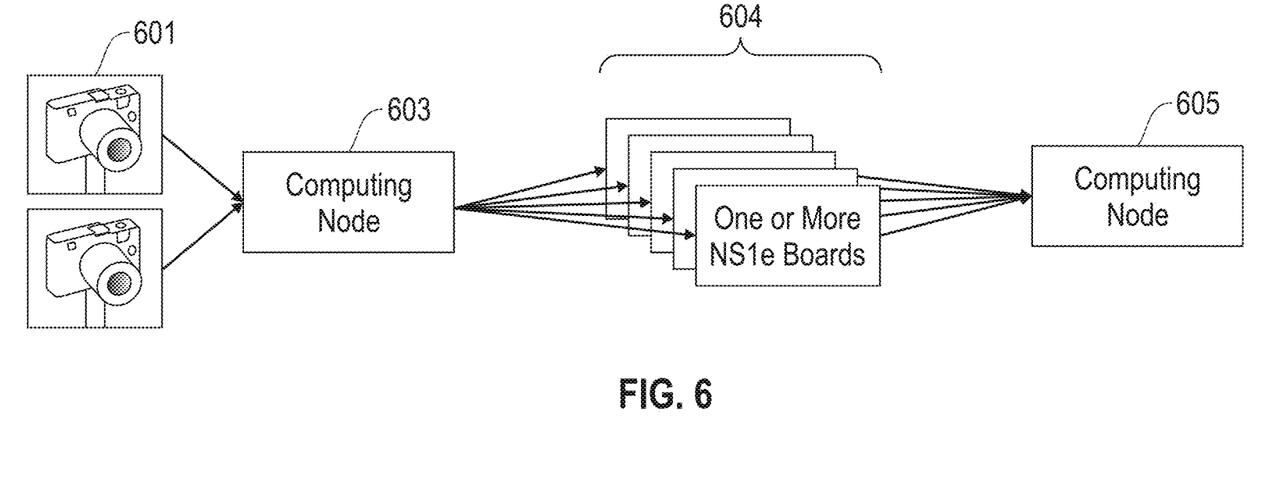
FIG. 6 illustrates an exemplary hardware configuration of an event-based system architecture according to embodiments of the present disclosure.

Referring to FIG. 6, an exemplary hardware configuration of an event-based system architecture according to embodiments of the present disclosure is illustrated. Cameras 601 provide image data to computing node 603, which distributes subsets of the input among a plurality of neural inference boards 604. In some embodiments, the neural inference boards are NS1e boards. Each board generated a partial disparity map, which are merged into a global disparity map and provided to computing node 605. Computing node 605 may then be used to visualize or further process the output. It will be appreciated that although computing nodes 603, 605, and boards 604 are pictured separately, they may be combined, for example by providing a plurality of boards on a bus within a single computing node.

Figure 7:
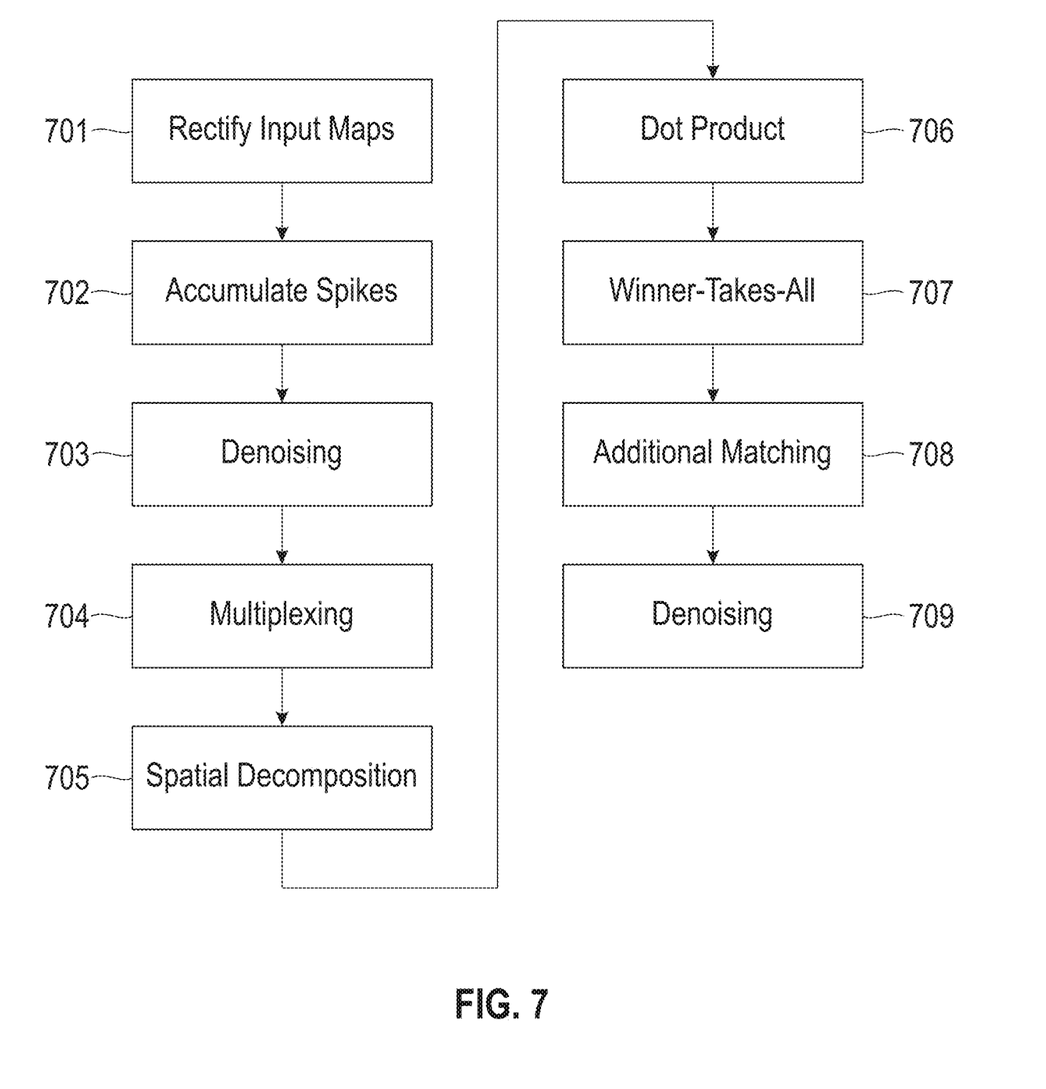
FIG. 7 illustrates a method of stereo disparity determination according to embodiments of the present disclosure.

Referring to FIG. 7, a method of stereo disparity determination is illustrated according to embodiments of the present disclosure. At 701, all input maps are rectified. This adjusts the images as if they were co-planar, ensuring that each pixel in the left image maps to some pixel in the same row of the right image. At 702, a ring buffer mechanism is used to create the temporal scales over which the spikes are accumulated and sent to subsequent stages for left-right matching. In various embodiments, multiple temporal scales are mixed to process simultaneously objects moving at different speeds and/or producing a varying number of spikes.

At 703, morphological erosion/dilation is optionally applied to denoise the image. At 704, the input frame is optionally multiplexed to n non-overlapping patches, at the cost of reducing the throughput by ~1/n. This further reduces processor requirements by a factor of n.

Figure 8:
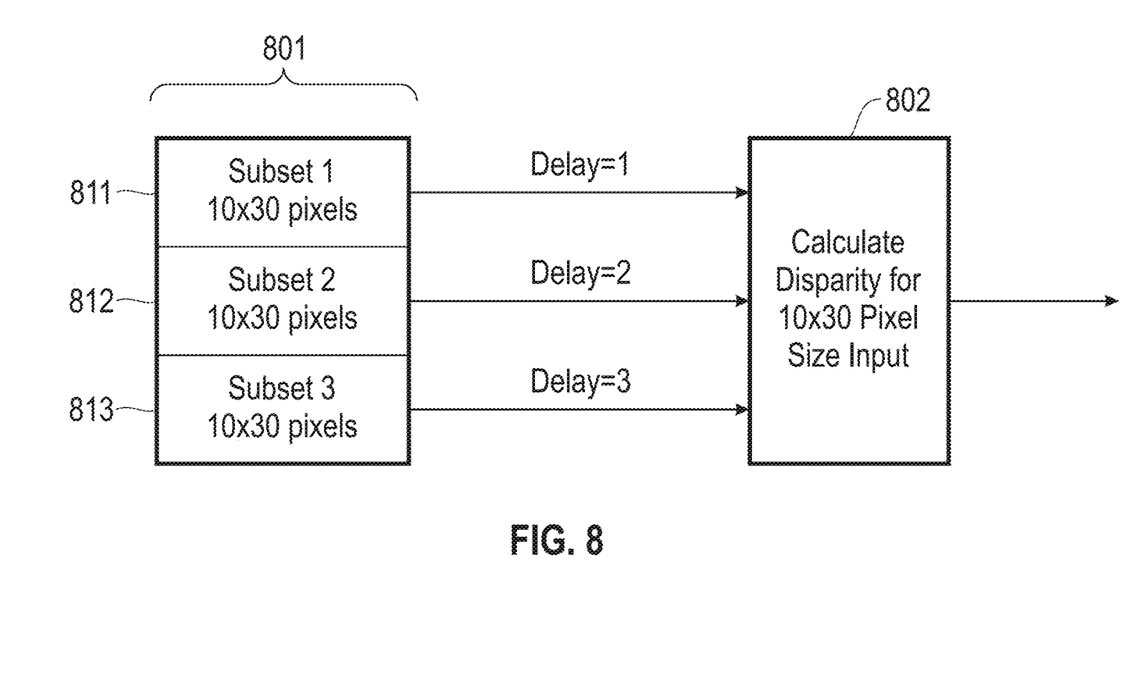
FIG. 8 illustrates multiplexing according to embodiments of the present disclosure.

Referring to FIG. 8, multiplexing is further illustrated. In this example, three ticks are allocated per frame. An input frame of 30×30 pixels is divided into subsets 811 . . . 813 of 10×30 pixels each. Each subset is sent for processing with a staggered delay. Accordingly, cores 802 need only be sufficient for calculating disparity for a 10×30 pixel input. Calculating the disparity for a 10×30 input uses about one third of the cores it would take to calculate it for a 30×30 size input (linear asymptotic complexity). During three consecutive ticks, cores 802 output the disparities for subsets 811 . . . 813 respectively.

At 705, the spatial scale decomposition is created (e.g., the pyramidal representation) of each distinct temporal scale that is input. At 706, given the inputs across multiple spatiotemporal scales, the corresponding filter template is applied to each of these inputs. For each pixel in the left image a neighborhood of pixels is extracted (whose size is specified in the filter parameters) across all polarity maps. The patch of pixels in the same row of the right image that is most similar. Similarity is measured using a binary dot product measure (e.g., logical AND).

At 707, a winner take all is applied to find for each left image pixel the right image pixel with the highest similarity measure. This provides the optimal disparity estimate.

At 708, extra constraints are applied to enhance the disparity accuracy. In addition to left to right matching, a right to left matching can also be applied. Under this matching, each pixel in the right image is compared to multiple pixels in the left image to find the best matching pixel in the left image. Thus, under this extra level of matching, a pixel xL in the left image is matched to pixel xR in the right image using the left to right constraints if and only if xR is also matched to pixel xL in the left image when using the right to left constraints. In some embodiments, a match occurs if and only if the match score is above a specific threshold.

Figure 9:
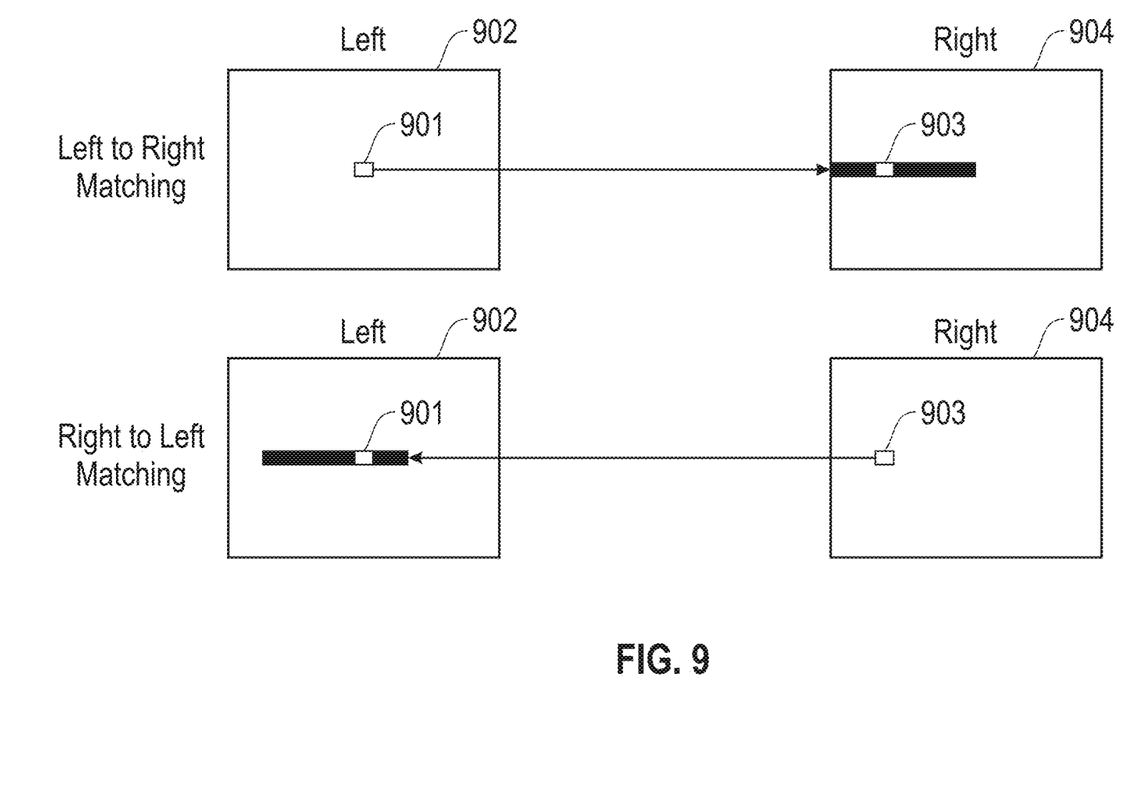
FIG. 9 illustrates left to right and right to left matching according to embodiments of the present disclosure.

Referring to FIG. 9, left to right and right to left matching are illustrated according to embodiments of the present disclosure. A pixel 901 in left image 902 is matched to a pixel 903 in right image 904 if and only if pixel 903 in right image 904 is again matched to pixel 901 when searching from right to left.

At 709, a binary morphological erosion and dilation is applied to each one of the disparity maps to suppress any spurious disparities. This has the effect of reducing the noise in the extracted disparities.

As set out above, in various embodiments, system and methods are provided for extracting stereo disparity at extremely high frame rates (in the order of up to two thousands of frames per second) on neuromorphic hardware given event based (spiking) inputs. In various embodiments, multiple neuromorphic chips are used (a scale out approach) so that each chip calculates the disparity on a subset of the input sensor's pixels. The distributed disparity estimates are then fused into a single disparity map. This fusion of the different disparity maps can take place either on neuromorphic hardware or on a von Neumann architecture computing node.

Various systems described herein fuse a multiscale spatiotemporal representation of the input in order to extract disparities whose signatures match across different scales in space and time. In various embodiments, the stereo rectification is done in neuromorphic hardware (not outside the hardware). In various embodiments, a denoising operation is done on each output disparity map to bring down the noise and better regularize the output. In various embodiments, the system has the ability to multiplex subsets of each chip's input so that the system runs slower but also takes fewer cores.

In various embodiments, the system has the ability to enforce exclusively in neuromorphic hardware left-right & right-left consistency constraints to improve the disparity accuracy. In various embodiments, the input comes from a high frame rate sensor. In various embodiments, a transduction layer is provided outside the neuromorphic chips in order to convert RGB data to spikes, if necessary.

Figure 10:
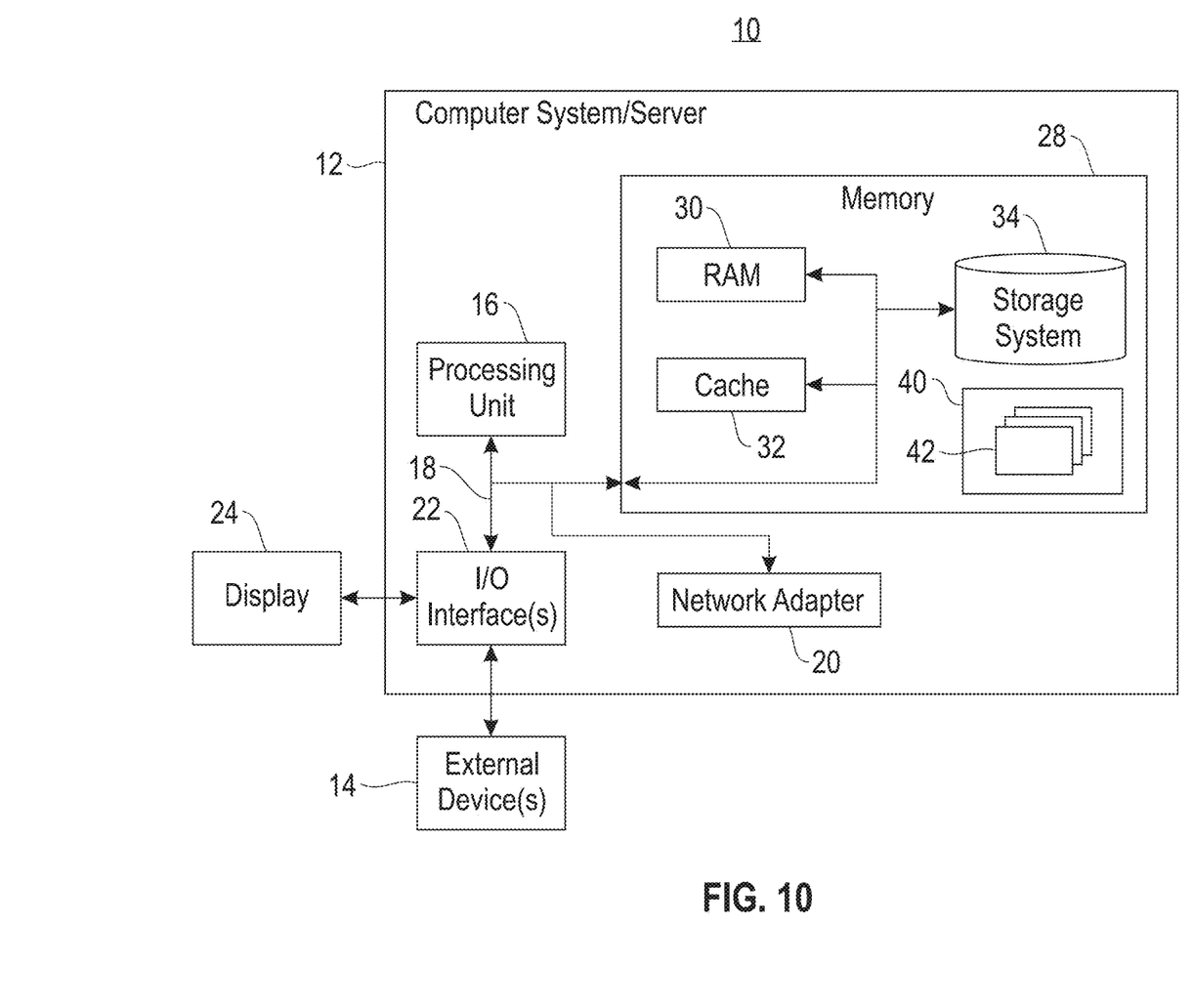
FIG. 10 depicts a computing node according to an embodiment of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a first and second spiking input sensor, each outputting a time series of spikes corresponding to a plurality of frames;
    a neurosynaptic network configured to:
        receive the time series of spikes corresponding to the plurality of frames;
        accumulate the time series of spikes in a ring buffer, thereby creating a plurality of temporal scales;
        for each corresponding pair of frames from the first and second spiking input sensors, determining a mapping of pixels in one of the pair of frames to pixels in the other of the pair of frames based on similarity;
        based on the pixel mapping, determining a disparity map.

2. The system of claim 1, wherein the input sensors comprise image sensors.

3. The system of claim 1, wherein the neurosynaptic network is further configured to denoise the plurality of frames.

4. The system of claim 2, wherein said denoising comprises morphological erosion/dilation.

5. The system of claim 1, wherein the neurosynaptic network further comprises a multiplexor adapted to divide each of the plurality of frames into a plurality of non-overlapping patches.

6. The system of claim 1, wherein the neurosynaptic network is further configured to denoise the disparity map.

7. The system of claim 6, wherein said denoising comprises morphological erosion/dilation.

8. The system of claim 1, wherein the neurosynaptic network comprises a plurality of chips.

9. The system of claim 8, wherein each chip is adapted to determine the disparity map for a non-overlapping patch of each of the plurality of frames.

10. The system of claim 8, wherein the neurosynaptic network is further adapted to fuse the disparity map from each chip into a global disparity map.

11. The system of claim 8, further comprising a computing node adapted to fuse the disparity map from each chip into a global disparity map.

12. The system of claim 1, wherein the neurosynaptic network is further adapted to rectify the plurality of frames.

13. The system of claim 1, the neurosynaptic network is further adapted to verify the pixel mapping by determining a reverse pixel mapping.

14. A method comprising:
    receive at a neurosynaptic network time series of spikes corresponding to a plurality of frames from a first and second spiking input sensor;
    accumulating the time series of spikes in a ring buffer of the neurosynaptic network, thereby creating a plurality of temporal scales;
    for each corresponding pair of frames from the first and second spiking input sensors, determining by the neurosynaptic network a mapping of pixels in one of the pair of frames to pixels in the other of the pair of frames based on similarity;
    based on the pixel mapping, determining by the neurosynaptic network a disparity map.

15. The method of claim 14, wherein the input sensors comprise image sensors.

16. The method of claim 14, wherein the neurosynaptic network is further configured to denoise the plurality of frames.

17. The method of claim 15, wherein said denoising comprises morphological erosion/dilation.

18. The method of claim 14, wherein the neurosynaptic network further comprises a multiplexor adapted to divide each of the plurality of frames into a plurality of non-overlapping patches.

19. The method of claim 14, wherein the neurosynaptic network is further configured to denoise the disparity map.

20. The method of claim 19, wherein said denoising comprises morphological erosion/dilation.

* * * * *